United States Patent [19]

Nattel et al.

[11] Patent Number: 5,359,151
[45] Date of Patent: Oct. 25, 1994

[54] CONSTRUCTION STUD PROTECTOR PLATE

[75] Inventors: William Nattel, Montreal; Daniel R. Lalancette, Quebec; Mark E. Fabian, St. Jean, all of Canada

[73] Assignee: Eaton Corporation, Cleveland, Ohio

[21] Appl. No.: 896,040

[22] Filed: Jun. 9, 1992

[51] Int. Cl.⁵ .............................................. H02G 3/26
[52] U.S. Cl. .......................................... 174/48; 52/359
[58] Field of Search ............... 174/48; 52/357, 359, 52/360; 24/295

[56] References Cited

U.S. PATENT DOCUMENTS

| | | | |
|---|---|---|---|
| 1,787,804 | 1/1931 | Thurman et al. | 52/359 X |
| 1,793,341 | 2/1931 | Thurman et al. | 52/359 |
| 3,208,119 | 9/1965 | Seckerson | 24/295 X |
| 3,240,869 | 3/1966 | Jureit | 174/135 |
| 3,515,797 | 6/1970 | Hochstetler | 174/135 |
| 3,689,681 | 9/1972 | Searer et al. | 174/48 |
| 3,855,413 | 12/1974 | Baillie | 174/48 |
| 4,050,205 | 9/1977 | Ligda | 174/48 X |
| 4,596,094 | 6/1986 | Teller et al. | 52/357 X |
| 4,649,689 | 3/1987 | Everman et al. | 52/359 X |
| 4,924,646 | 5/1990 | Marquardt | 52/221 |
| 5,101,540 | 4/1992 | Roof et al. | 24/295 X |

Primary Examiner—Leo P. Picard
Assistant Examiner—David Tone
Attorney, Agent, or Firm—Martin J. Moran

[57] ABSTRACT

A protector plate used in the construction industry for protecting electric wiring which passes through metal studs. The protector plate is formed from metal sheeting to create a face plate which has an attaching member connected thereto. The attaching member allows the protector plate to be secured upon the metal stud without the use of attaching hardware such as nails or screws. The attaching member comprises any one of a bendable tab, a twistable tab, a resilient member, or any combination thereof.

3 Claims, 7 Drawing Sheets

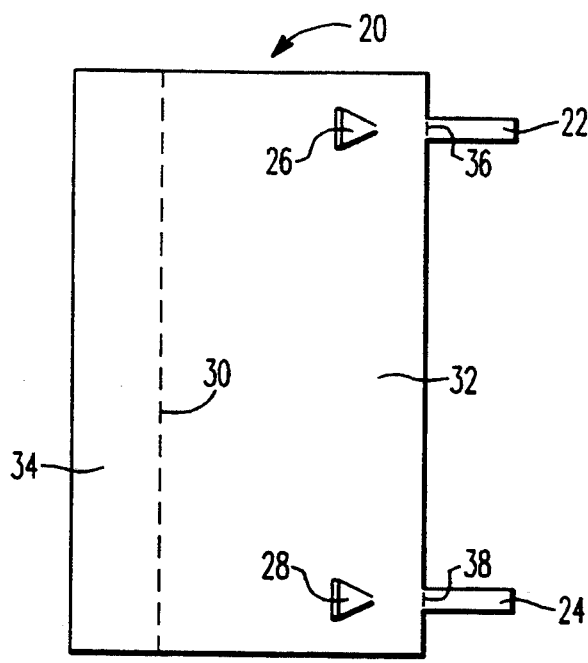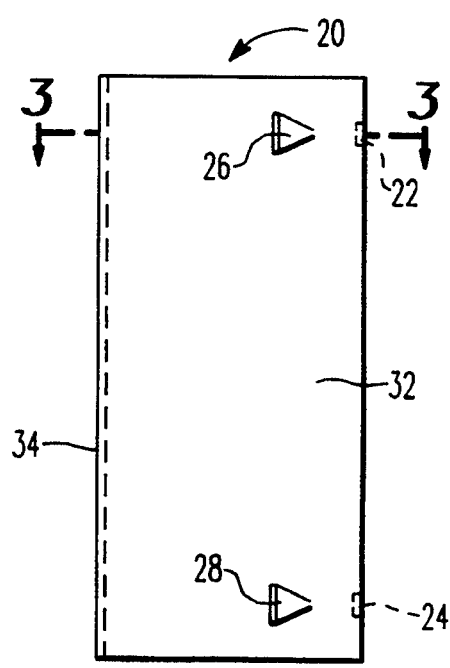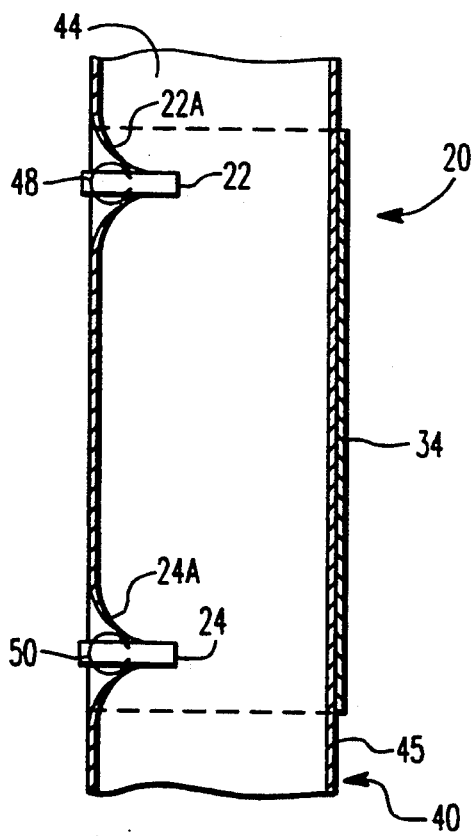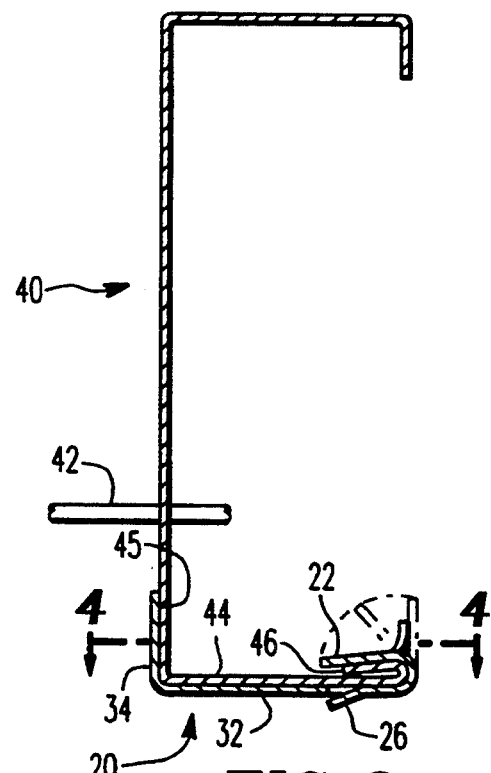
FIG. 1
FIG. 2
FIG. 4
FIG. 3

CONSTRUCTION STUD PROTECTOR PLATE

BACKGROUND OF THE INVENTION

This invention relates generally to protector plates for studs used in the construction industry and more particularly to protector plates for protecting electrical cables which pass through metal studs.

Behind the wall, wiring often requires routing the cables through the studs which are used to support wallboards. This construction technique has given rise to the development of protector plates as a result of safety problems that have arisen. Specifically, it is found that cables passing through studs at a depth close to the attached wallboard are exposed to accidental penetration caused by the insertion of nails or screws, typically driven into the studs for mounting the wallboards. To solve this problem, metal protector plates are applied to the stud face over the opening through which the wiring or piping passes. These metallic protector plates are effective in preventing the insertion of nails or screws into the stud and effectively eliminate the danger of accidental penetration.

Typically, the previously described problem is most severe when wooden studs are used. As a result, current protector plates are designed for easy application to wooden surfaces. These protector plates are often designed from sheets of metal with nail-like prongs extending therefrom similar to the protector plate disclosed in U.S. Pat. No. 3,240,869 entitled "Cable Protector Plate" and issued Mar. 15, 1966. In applying these protector plates to wooden studs, the protector plate is placed upon the wooden stud at the desired location and then hammered in place causing the nail-like prongs to become imbedded in the wooden surface. This procedure holds the protector plate temporarily upon the wooden stud until the wallboard is mounted thereon whereupon the plate is permanently secured between the two surfaces. This procedure works well for wooden studs. It has now become desirous to utilize these protector plates in steel stud applications. Specifically, the Canadian Electrical Code now calls for the application of protector plates to all studs, including metal studs, that have electrical cables passing therethrough at a distance less than 1 and ¼ inches from the stud face.

While this requirement poses no problem when wooden studs are involved, the current design of protector plates does not lend itself to easy application to steel studs. Specifically, the nail-like prongs utilized in the current design have the disadvantage of not being able to penetrate the steel stud. As a result, to mount the protector plate on steel studs, screws must be utilized. This procedure has the disadvantage of being time consuming. A further disadvantage of this procedure is the exposure of the wiring to accidental penetration by the insertion of the securing screws into the stud, a problem the protector plate was originally designed to protect against.

To overcome these disadvantages and problems it would be advantageous if a way could be found to secure metal protector plates to steel studs without the use of time consuming procedures or securing hardware such as screws or nails. This would allow for the protection of the behind the wall wiring when steel studs are used in the construction process.

SUMMARY OF THE INVENTION

In accordance with the present invention, the need for providing an easy and safe method of attaching metal protector plates to steel studs has been satisfied.

This need has been satisfied by constructing a protector plate comprised of a metallic front plate having an integrally formed attaching mechanism. The metallic front plate is disposed over the location on the steel stud behind which the cable passes thereby protecting the cable from accidental penetration while the attaching mechanism operates to hold the front plate upon the steel stud without the use of externally applied attaching hardware. This allows for easy and safe application.

In one embodiment, the attaching mechanism consists of a pair of bendable tabs which are integrally attached to the front plate. As the front plate is disposed upon the steel stud, the tabs are bent around the lip of the steel stud thereby causing the tabs to be engaged in the resulting deformation. This engagement between the tabs and the lip of the steel stud prevent the protector plate from moving up and down the stud and secures the protector plate upon the stud as the wallboard is finally attached.

In an alternative embodiment, the aforementioned attaching mechanism consists of a resilient holding member. This holding member is integrally attached to the metallic front plate and holds the front plate upon the face of the steel stud by pinching the stud between the holding member and the back of the front plate. As in the previous embodiment, this embodiment secures the protector plate upon the steel stud without the use of external attaching hardware while allowing the metallic front plate to provide the desired protection for the behind the wall wiring or piping.

In a further embodiment, the protector plate is constructed with a grasping mechanism in addition to the attaching mechanism. As the front plate is disposed upon the steel stud such that the stud is between the grasping and attaching mechanisms, the attaching mechanism, consisting of a pair of twistable tabs, is twisted into the stud lip. The protector plate is thereby secured upon the metallic stud as a result of the stud being pinched between the attaching and grasping mechanisms.

BRIEF DESCRIPTION OF THE DRAWINGS

A full understanding of the invention can be gained from the following description when read in conjunction with the following drawings, in which:

FIG. 1 shows the preformed, unbent plan view of a protector plate;

FIG. 2 shows the protector plate of FIG. 1 after forming and bending;

FIG. 3 shows a sectional view through section line 3—3 of FIG. 2 of the protector plate of FIG. 1 as disposed upon a metal stud;

FIG. 4 shows a sectional view through the section line 4—4 of FIG. 3 of the protector plate of FIG. 1 disposed upon the metal stud;

DETAILED DESCRIPTION OF THE PREFERRED EMBODIMENTS

Figure 5:
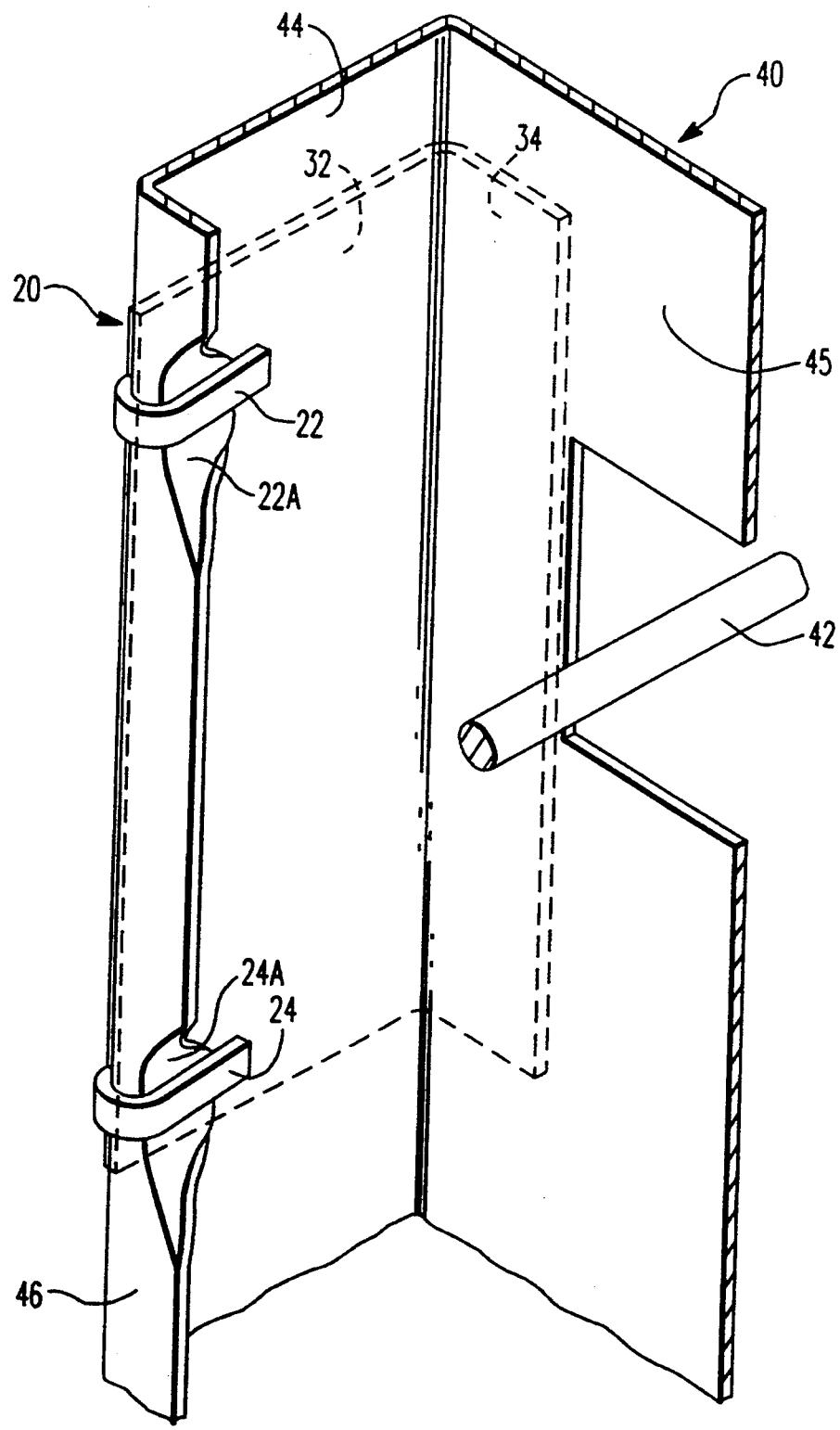
FIG. 5 shows an isometric view of the protector plate and metal stud of FIGS. 3 and 4.

While the invention can be used for providing a protective surface for wiring or plumbing which passes through a stanchion having an open faced configuration, the invention will be described hereinafter in the context of electric wiring which passes through a steel stud used for supporting wallboard.

Referring to FIG. 1, shown is the protector plate 20 in its preformed state. The protector plate 20 is constructed from a unitary piece of metal sheeting such as steel. Typically this sheeting is nearly rectangular in shape and formed to have protruding therefrom along one side a pair of laterally extending, nearly rectangular, bendable tabs 22 and 24. Nearly adjacent to the tabs 22 and 24, and on the face of the metal sheeting, may be positioned a pair of protuberances 26 and 28 which can be formed by outwardly punching into nearly pyramidally shaped segments the metal sheeting itself.

In forming the protector plate 20 for utilization upon a steel stud, the nearly rectangular sheeting is bent along dashed line 30, shown in FIG. 1, at approximately a ninety degree angle. This bending creates the nearly rectangular front plate 32 and the attached corresponding nearly rectangular side plate 34. The bending about line 30 is performed to ensure that the width of the front plate 32 matches the width of the steel stud face on which the protector plate 20 is to be disposed. Also bent at nearly a ninety degree angle along the dashed lines 36 and 38 of FIG. 1 are the tabs 22 and 24. Once the bending has been completed, the protector plate, now shown in FIG. 2, is ready for mounting upon a steel stud.

Referring to FIG. 3, a section of the protector plate 20 disposed upon a steel stud 40 is shown. The protector plate 20 is positioned upon the face of the stud 40 over the location behind which the wiring 42 passes through the stud 40. The positioning of the protector plate 20 at this location serves to protect the wiring 42 from inadvertent penetration caused by nails or screws being inserted into the stud. Once the protector plate 20 is positioned upon the stud 40, such that the front plate 32 rests upon the stud face 44, the side plate 34 rests against the stud side 45, and the tabs 22 and 24 rest against the stud lip. 46, the tabs 22 and 24 are further bent into the stud lip 46 thereby preventing lateral sliding of the protector plate and securing it to the stud. This attachment of the protector plate 20 to the stud 40 by bendably attaching the tab 22 to the stud lip 46 is diagrammatically illustrated by the dashed lines in FIG. 3. As shown in FIGS. 4 and 5, once the tabs 22 and 24 are bent into the side 46 of the steel stud 40 the resulting depressions or deformations 22A and 24A, caused by the bending of the tabs 22 and 24 into the side 46, prevent the protector plate 20 from moving vertically along the steel stud 40. The protector plate 20 is also prevented from moving laterally along the steel stud 40 by the gripping of the steel stud between the tabs 22 and 24 and the side plate 34. Furthermore, the side plate 34 aids the attachment by acting to restrain the protector plate from twisting free from the stud 40 about the tab connection axes 48 and 50, shown in FIG. 4. It should be noted that one or more bendable tabs may be utilized to connect the protector plate to the steel stud in this configuration.

Figure 6:
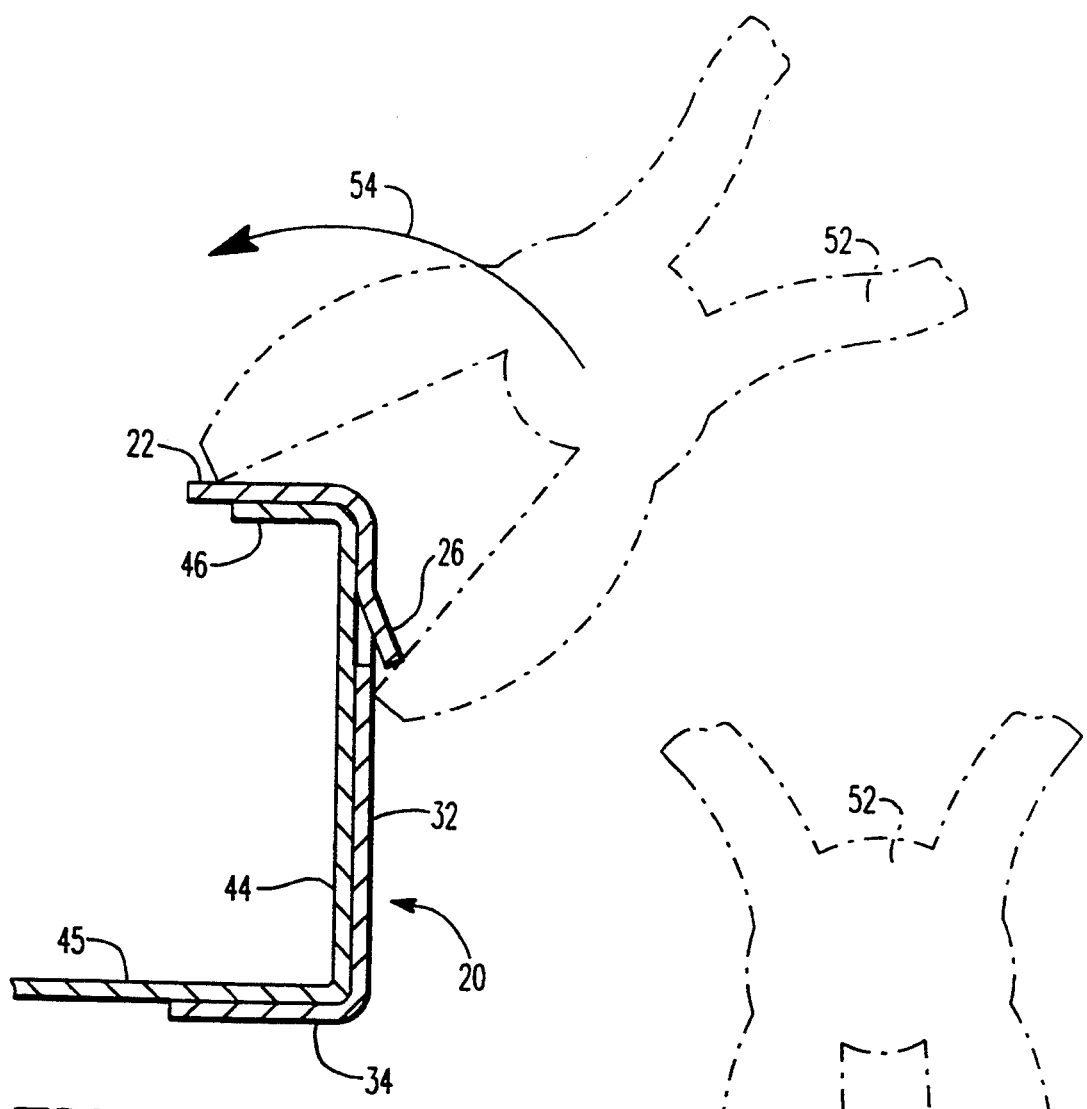
FIGS. 6 and 7 illustrate a process for attaching the protector plate of FIG. 1 to a metal stud.
Figure 7:
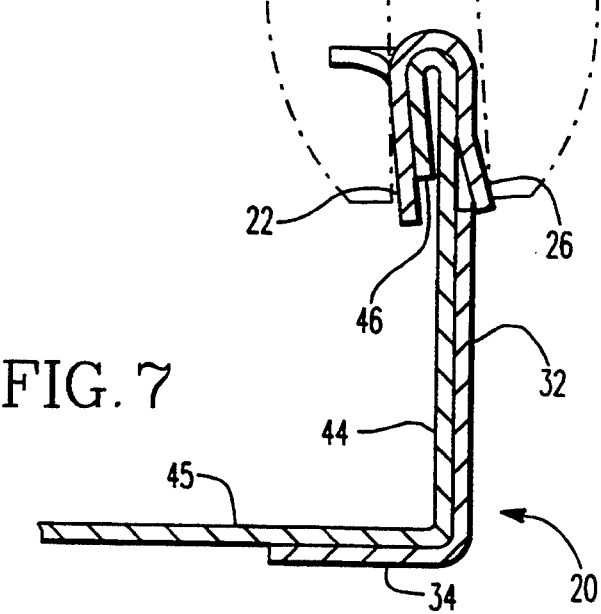

FIGS. 6 and 7 diagrammatically illustrate the bending procedure utilized to attach the tabs around the stud lip 46, specifically shown as applied to the tab 22. In bending the tab 22 around the stud lip 46 a gripping tool, in this case a pair of pliers 52, is positioned upon the protector plate such that the jaws of the tool are positioned around the protuberance 26 and the tab 22. The near pyramidal shape of the protuberance 26 provides the pliers 52 with a gripping surface which in turn aids in the bending of the tab 22 around the lip 46. Utilizing the gripping edge provided, the jaws of the pliers may be moved circularly against the tab 22 and the lip 46, shown by the directional line 54 in FIG. 6. The side plate 34 aids the gripping procedure by holding the protector plate 20 upon the steel stud 40 by engaging the stud side 45. As illustrated in FIG. 7, once the arcuate motion is completed, the tab 22 has caused the stud lip 46 to be correspondingly depressed. This bending procedure provides the aforementioned connection between the protector plate and the steel stud. It should be further noted that the previously described procedure may be accomplished without the aid of the gripping protuberances through the utilization of a special tool known in the trade as pump pliers. Furthermore, the protector plate may also be manufactured without the side plate 34 while still being utilizable upon the steel stud.

Figure 8:
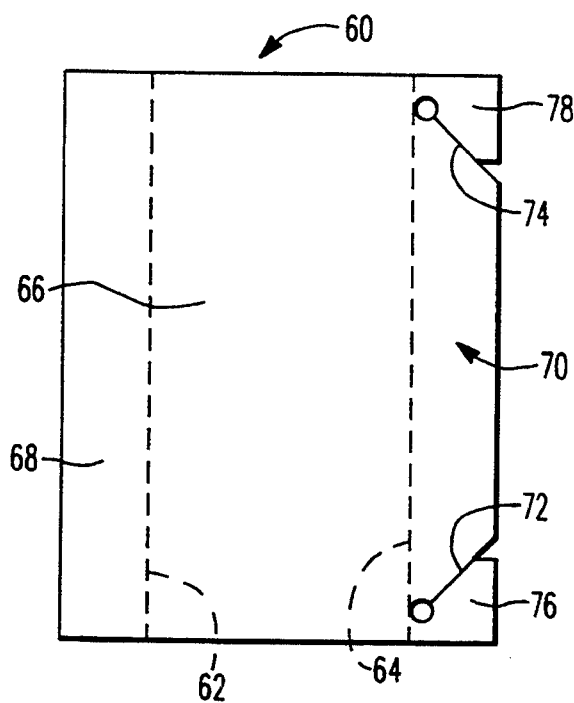
FIG. 8 shows the preformed, unbent plan view of an alternative embodiment of the protector plate.
Figure 9:
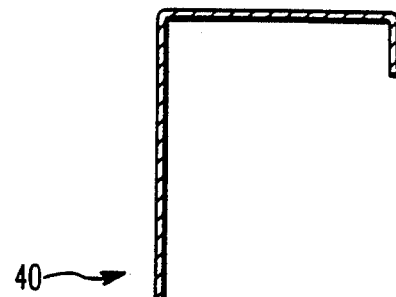
FIG. 9 shows a sectional view of the protector plate of FIG. 8 disposed upon a metal stud.
Figure 10:
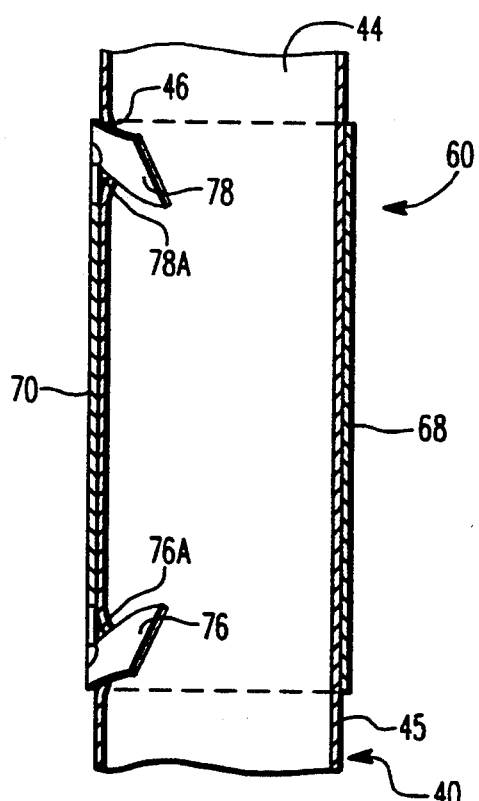
FIG. 10 shows a sectional view through line 10—10 of FIG. 9 of the protector plate of FIG. 8 disposed upon a metal stud.

An alternative embodiment of the above described protector plate is shown in FIGS. 8, 9, and 10. Specifically, FIG. 8 shows the preformed state of the alternative protector plate 60. Once again, the protector plate 60 is constructed from a unitary piece of metal sheeting such as steel. Typically the sheeting is nearly rectangular in shape but lacking the laterally extending, nearly rectangularly shaped tabs found in the protector plate 20.

In forming the protector plate 60 for use upon a steel stud, the metal sheeting is bent approximately ninety degrees along the dashed lines 62 and 64 shown in FIG. 8. This bending creates the nearly rectangular front plate 66, the nearly rectangular side plate 68, and another nearly rectangular side plate 70. The rectangularly shaped side plate 70 is further constructed having a pair of angularly cuts grooves 72 and 74 near each end of the side plate 70. These angular cuts 72 and 74 create the twistable tabs 76 and 78 at the ends of the side plate 70. While the embodiment shown in FIG. 8 has a pair of twistable tabs, any number of tabs may be cut into the side plate 70 for use in attaching the protector plate 60 to a steel stud. Again the bending along lines 62 and 64 is performed to leave the front plate 66 with a width equal to the width of the face of the stud to which it is to be disposed.

Referring to FIGS. 9 and 10, the protector plate 60 disposed upon a steel stud 40 is shown. As before, the protector plate 60 is placed upon the steel stud over the location behind which the electric cable 42 passes. Once the protector plate 60 is disposed upon the stud 40, such that the side plate 70 and twistable tabs 76 and 78 are adjacent stud lip 46 and side plate 68 is adjacent stud side 45, the twistable tabs 76 and 78 are twisted into the stud lip 46. This twisting of the twistable tabs 76 and 78 in a key turning manner may be accomplished with a pair of pliers or any other tool capable of grabbing the twistable tabs. The tabs 76 and 78 operate to frictionally engage the stud lip 46 to prevent lateral sliding of the protector plate. Furthermore, as the tabs 76 and 78 are bent into the stud lip 46, they cooperate with the side plate 70 to pinch the steel stud thereby preventing transverse motion of the protector plate on the steel stud which further secures the protector plate upon the stud face. Finally, as the wallboard is attached, the protector plate is secured between the stud face and the wallboard itself. It should be noted that one or more twistable tabs may be utilized in this embodiment.

Figure 11:
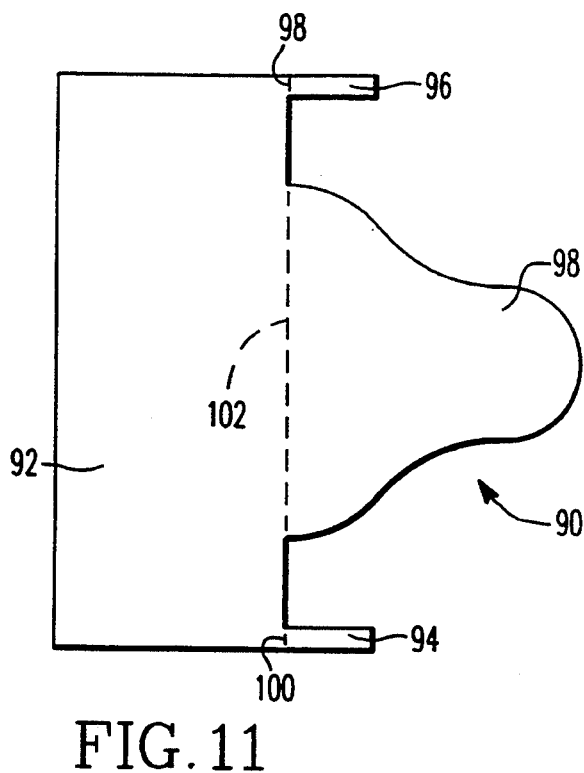
FIG. 11 shows the preformed, unbent plan view of a second alternative embodiment of the protector plate.

FIGS. 11-15 illustrate an embodiment for a third protector plate 90 which utilizes a resilient attaching mechanism to hold the protector plate upon a steel stud. Referring to FIG. 11, shown is the preformed state of the protector plate 90 which comprises a piece of metal sheeting such as steel. Typically this sheeting has a nearly rectangular portion which will form the front plate 92. The sheeting my further have a pair of laterally extending, nearly rectangular, bendable tabs 94 and 96. Positioned between the tabs 94 and 96 and also formed from the metal sheeting is a flange-like resilient member 98.

Figure 12:
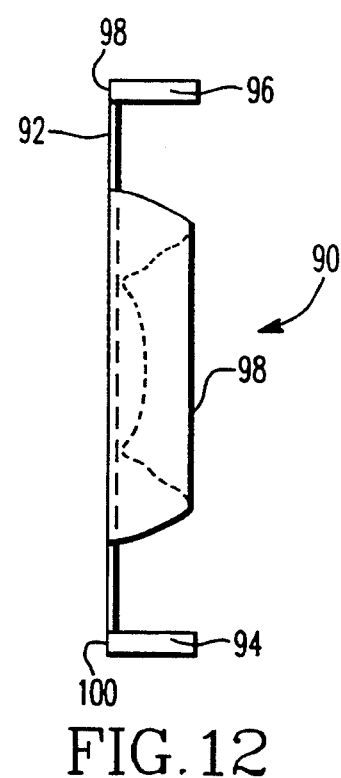
FIG. 12 shows the protector plate of FIG. 11 after forming and bending.

In forming the protector plate 90 for utilization upon a steel stud, the tabs 94 and 96 are bent at nearly a right angle to the front plate 92 along the dashed lines 98 and 100. The resilient member 98 is then circularly bent approximately one-hundred eighty degrees along the dashed line 102 and in the same direction as the tabs 94 and 98 until a nearly central portion of the resilient member 98 comes in contact with the face plate 92. The end portion of resilient member 98 may then be bent away from the front plate 92 in a direction opposite the circular bend previously performed upon the resilient member 98. While this second bend is being applied to the end of the resilient member 98, the nearly central portion of the resilient member 98 remains in contact with the front plate 92. As a result of this second bend, a curved opening which leads to the contact point between the resilient member 98 and front plate 92 is created. The curvatures applied to the resilient member 98 which result in the contact between the resilient member 98 and the front plate 92 as well as the opening leading to the contact point is clearly seen in the sectional view of the protector plate 90 of FIG. 13. Once the bending has been completed, the protector plate, now shown in FIG. 12 is ready for mounting upon the steel stud.

Figure 14:
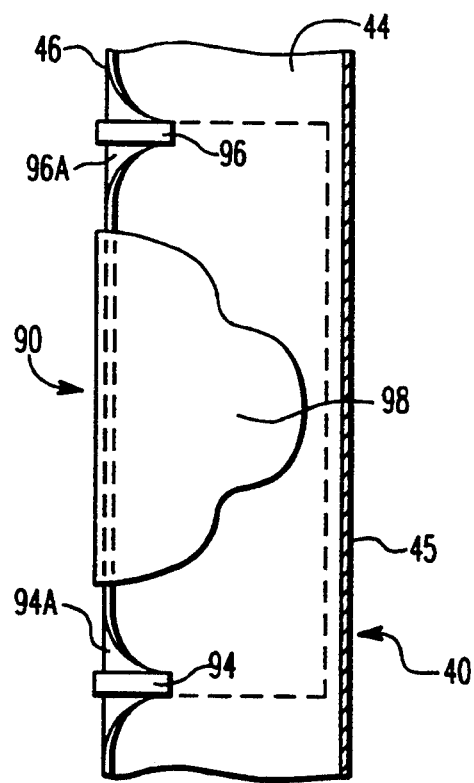
FIG. 14 shows a sectional view through the line 14—14 of FIG. 13 of the protector plate of FIG. 11 disposed upon the metal stud.
Figure 13:
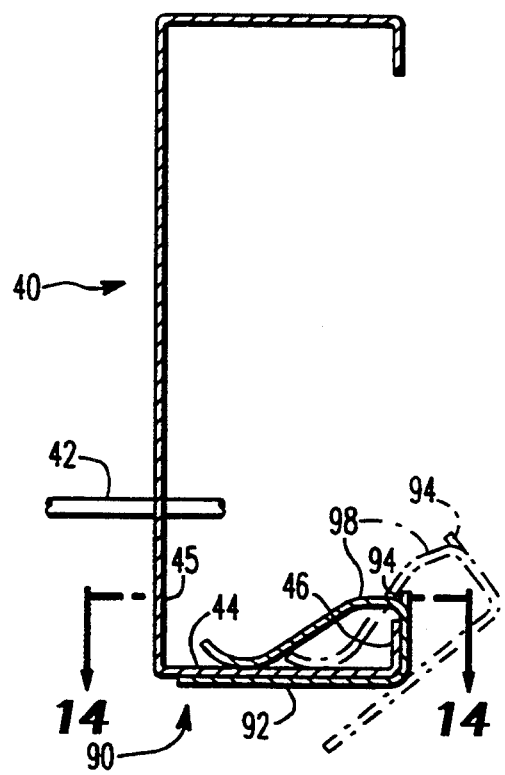
FIG. 13 shows a sectional view of the protector plate of FIG. 11 disposed upon a metal stud.
Figure 15:
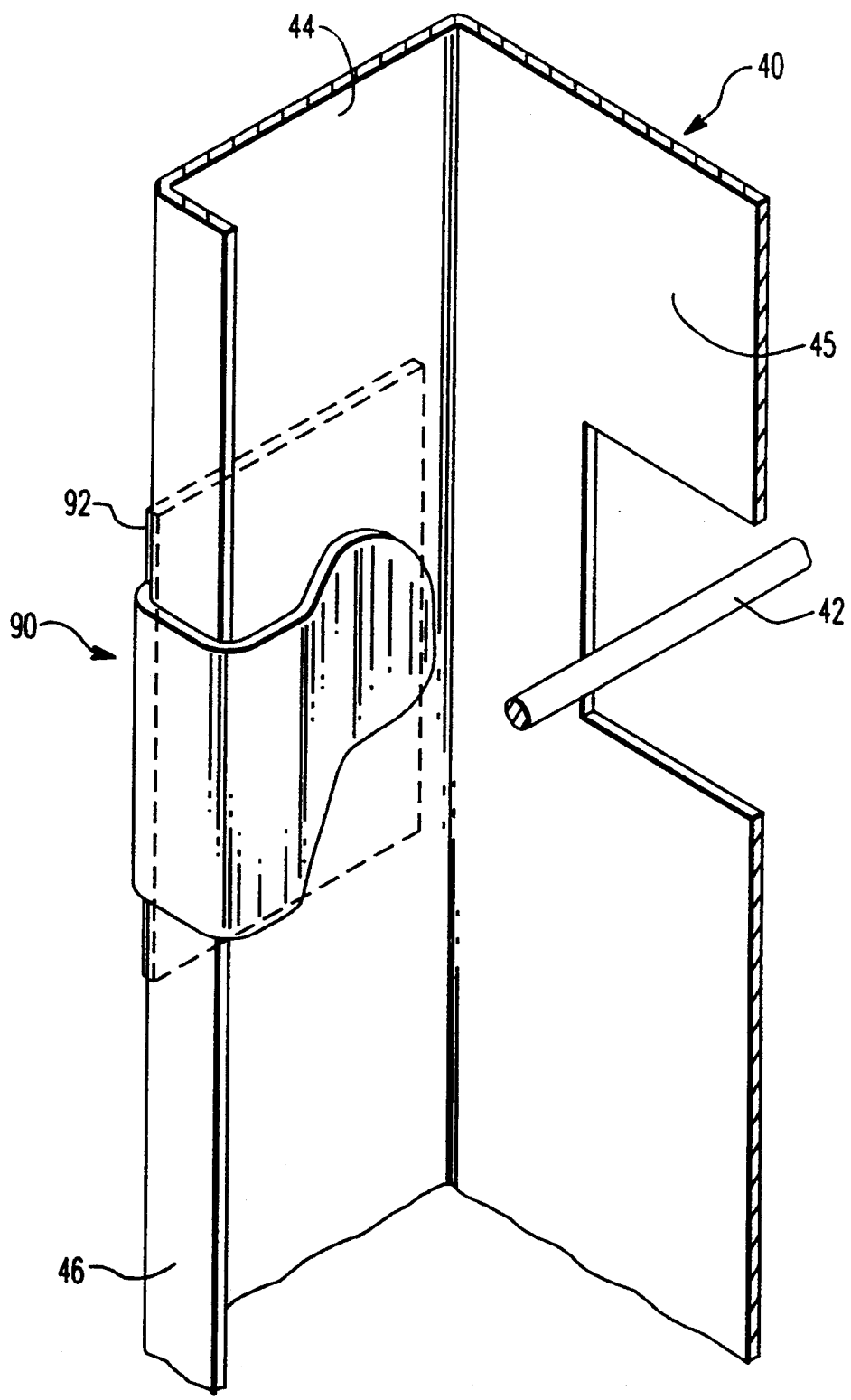
FIG. 15 shows an isometric view of the protector plate and metal stud of FIGS. 13 and 14.

Turning now to FIG. 13, a sectional view of the protector plate 90 being disposed upon a steel stud 40 is shown. As with the previously described protector plates, the protector plate 90 is positioned upon the stud face 44 over the location behind which the wiring 42 passes for providing the desired protection. The present embodiment is disposed upon the steel stud 40 by sliding the protector plate 90 over the stud lip 46 such that the stud face 44 is trapped or fictionally engaged between the plate face 92 and the resilient member 98. The curved opening created by the bending of the end portion of the resilient member 98 allows the protector plate 90 to be easily slid over the stud lip 46 while the circular-like curve used to form the resilient member 98 accommodates the stud lip 46 when the protector plate is fully disposed upon the stud. The disposition of the stud lip 46 within the circular bend of the resilient member 98 coupled with the tendency of the resilient member 98 to remain flush against the stud face 44 acts to further secure the protector plate upon the stud 40 by preventing lateral movement of the protector plate 90 upon the stud 40. The mounting of the protector plate 90 upon the stud 40 is diagrammatically illustrated by the dashed lines shown in FIG. 13. As shown in FIG. 14, to further secure the protector plate upon the stud, the attaching tabs 94 and 96 may be bent to engagably contact the stud lip 46 utilizing the attaching procedure discussed in reference to the previously described protector plate 20. The depressions 94A and 96A created by this bending procedure cooperate with the tabs 94 and 96 to further secure the protector plate 90 upon the stud 40. It should be noted that the attaching tabs 94 and 96 are not required to secure the protector plate 90 upon the stud 40, as depicted in FIG. 15 which shows the frictional engagement of the stud face 44 between the resilient member 98 and the face plate 92. It should also be noted that while the protector plate 90 depicted in FIGS. 11-14 lacks the aforementioned gripping protuberances, the present protector plate 90 may be manufactured with these protuberances for allowing a wide range of bending tools to be utilized in the attachment process when the associated attaching tabs 94 or 96 are utilized.

Figure 16:
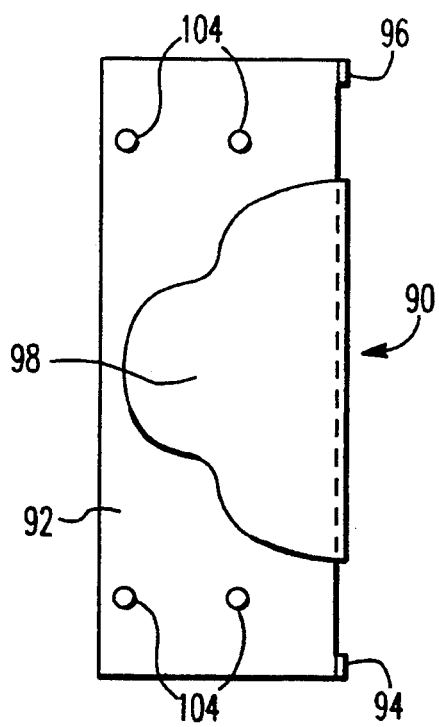
FIG. 16 shows a view of a formed alternative embodiment of the protector plate of FIG. 11.
Figure 17:
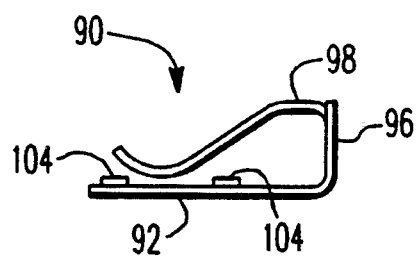
FIG. 17 shows a view of the protector plate of FIG. 16.

FIGS. 16 and 17 show a further embodiment of the protector plate 90 wherein the protector plate 90 is further manufactured with friction producing projections 104. Any number of these projections 104 may be disposed upon the front plate 92 and may be formed by metal punching the sheeting from which the front plate 92 is formed. When the protector plate 90 is disposed upon the steel stud, the projections 104 cooperate with the resilient member 98 to enhance the previously described frictional engagement of the stud between the resilient member 98 and the face plate 92.

Figure 18:
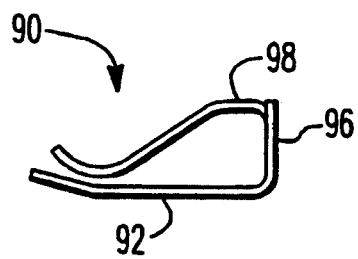
FIG. 18 shows a view of a further alternative embodiment of the protector plate of FIGS. 11 and 12.

A further method of forming the protector plate 90 is shown in FIG. 18. In this variation, the front plate 92 of the protector plate 90 is provided with a slight bend towards the holding member 98. This cooperating bend allows the holding member 98 to exert an enhanced pressure upon the stud face once the protector plate 90 is disposed thereon. This cooperation between the resilient member 98 and the bent face plate 92 fictionally engages the steel stud when the steel stud is disposed therebetween.

It should be apparent from the preceding descriptions that this design of a protector plate has among other advantages, the advantage of allowing a protector plate to be quickly disposed upon a steel stud without the use of external fastening hardware.

It is to be understood that the descriptions and drawings shown with respect to the present invention are not limiting and that other protector plate designs utilizing stud lip clamping mechanisms, resilient attaching members, twisting members, and combinations thereof for securing a protector plate upon a steel stanchion are contemplated.

We claim:

1. A process for securing a protector plate on a metal construction beam which is defined by a side surface intermediate spaced first and second end surfaces and wherein said protector plate comprises a front plate, attachment means protruding from said front plate, and grasping means protruding from said front plate, comprising the steps of:

juxtapositioning said front plate to said side surface in such a manner that said first end surface contacts said attachment means and said second end surface contacts said grasping means;

maneuvering a portion of said attachment means around said first end surface; and depressing said first end surface as said attachment means is maneuvered therearound.

2. A process for securing a protector plate on a metal construction beam which is defined by a side surface intermediate spaced first and second end surfaces and wherein said protector plate comprises a front plate, attachment means protruding from said front plate, and grasping means protruding from said front plate, comprising the steps of:

juxtapositioning said front plate to said side surface in such a manner that said first end surface contacts said attachment means and said second end surface contacts said grasping means; and twisting said attachment means into said first end surface thereby pinching said metal construction beam between said attachment means and said grasping means.

3. A protector plate for disposal on a metal construction beam which is defined by a side surface intermediate spaced first and second end surfaces, where said first end surface terminates in a first end surface edge which is spaced from said side surface, comprising:

a front plate;

a bendable, tabular member attached to said front plate which cooperates with said first end surface for preventing substantial movement of said front plate in a plane substantially transverse to said side surface;

grasping means protruding from said front plate and which cooperates with said second end surface for preventing substantial movement of said front plate in a plane substantially parallel to said side surface, and said front plate having an outwardly disposed substantially dove-tailed protuberance, said protuberance cooperating with a tool used to bend said bendable tabular member.

* * * * *